(12) United States Patent
Earleson

(10) Patent No.: US 8,310,176 B2
(45) Date of Patent: Nov. 13, 2012

(54) TRACTION CONTROL FOR DC ELECTRIC MOTOR

(75) Inventor: Walter E. Earleson, Morton, IL (US)

(73) Assignee: Progress Rail Services Corp, Albertville, AL (US)

( * ) Notice: Subject to any disclaimer, the term of this patent is extended or adjusted under 35 U.S.C. 154(b) by 505 days.

(21) Appl. No.: 12/643,779

(22) Filed: Dec. 21, 2009

(65) Prior Publication Data

US 2010/0162918 A1 Jul. 1, 2010

Related U.S. Application Data

(60) Provisional application No. 61/193,755, filed on Dec. 22, 2008.

(51) Int. Cl.
*H02P 5/00* (2006.01)

(52) U.S. Cl. .............. 318/52; 318/79; 318/83; 318/144

(58) Field of Classification Search .................... 318/52, 318/79, 82, 83, 144, 251
See application file for complete search history.

(56) References Cited

U.S. PATENT DOCUMENTS

| | | | |
|---|---|---|---|
| 2,428,574 A * | 10/1947 | Lentz, Jr. ........................ 290/17 |
| 3,737,745 A | 6/1973 | Chevaugeon et al. |
| 3,743,900 A | 7/1973 | Johansson |
| 3,764,867 A | 10/1973 | Smith |
| 3,790,871 A | 2/1974 | Smith |
| 3,898,937 A | 8/1975 | Johnson |
| 3,930,189 A | 12/1975 | Smith |
| 3,982,164 A | 9/1976 | de Buhr et al. |
| 3,984,663 A | 10/1976 | de Buhr et al. |
| 3,997,822 A | 12/1976 | Logston, Jr. et al. |
| 4,012,677 A | 3/1977 | Rist et al. |
| 4,012,680 A | 3/1977 | Dickerson et al. |
| 4,090,119 A | 5/1978 | Griffith et al. |
| 4,095,147 A | 6/1978 | Mountz |
| 4,114,555 A | 9/1978 | O'Brien, Jr. |
| 4,134,048 A * | 1/1979 | Schneider ...................... 318/52 |
| 4,136,303 A | 1/1979 | Almquist et al. |
| 4,298,940 A | 11/1981 | Tadokoro et al. |
| 4,328,427 A | 5/1982 | Bond |
| 4,463,289 A | 7/1984 | Young |
| 4,896,090 A | 1/1990 | Balch et al. |
| 4,950,964 A | 8/1990 | Evans |
| 5,878,189 A | 3/1999 | Lankin et al. |
| 6,021,251 A | 2/2000 | Hammer et al. |
| 6,031,965 A | 2/2000 | Hammer et al. |

(Continued)

*Primary Examiner* — Bentsu Ro
*Assistant Examiner* — Thai Dinh
(74) *Attorney, Agent, or Firm* — Finnegan, Henderson, Farabow, Garrett & Dunner LLP

(57) ABSTRACT

A method of propelling a mobile machine is disclosed. The mobile machine may have a plurality of DC traction motors, including a first DC traction motor and a second DC traction motor. The method may include driving a first traction device with the first DC traction motor, the first DC traction motor including a first field coil and a first armature electrically connected in series. The method may also include driving a second DC traction device with the second DC traction motor electrically connected in series with the first DC traction motor, the second DC traction motor including a second field coil and a second armature electrically connected in series. Additionally, the method may include, in response to slippage of the first traction device, bypassing at least a portion of electric current flowing through the first field coil around the first armature. The method may also include directing at least a portion of the bypassed electric current through the second field coil and the second armature.

18 Claims, 8 Drawing Sheets

U.S. PATENT DOCUMENTS

| | | |
|---|---|---|
| 6,634,303 B1 | 10/2003 | Madsen et al. |
| 7,026,776 B1 | 4/2006 | Walters |
| 7,064,507 B2 | 6/2006 | Donnelly et al. |
| 7,084,602 B2 * | 8/2006 | Donnelly et al. ............. 318/807 |
| 7,126,293 B1 | 10/2006 | Kumar |
| 7,898,194 B2 * | 3/2011 | Earleson ................. 318/139 |
| 7,940,016 B2 * | 5/2011 | Donnelly et al. ............ 318/139 |
| 2003/0223738 A1 | 12/2003 | Hughes et al. |
| 2005/0189886 A1 | 9/2005 | Donnelly et al. |
| 2009/0256514 A1 | 10/2009 | Earleson |

* cited by examiner

TRACTION CONTROL FOR DC ELECTRIC MOTOR

This application claims the benefit of priority under 35 U.S.C. §119(e) of U.S. Provisional Application No. 61/193,755, filed Dec. 22, 2008, the disclosure of which is incorporated herein by reference.

TECHNICAL FIELD

The present disclosure relates to DC electric traction motors and, more particularly, to a traction control system for DC electric traction motors, which finds use on a locomotive.

BACKGROUND

Many mobile machines include DC electric traction motors for driving a propulsion device to propel the mobile machine. For example, locomotives often include multiple DC electric traction motors for driving wheels to propel the locomotive. Such a mobile machine may have its DC electric traction motors electrically connected in various manners. For example, at any given time, the DC electric traction motors of a locomotive are typically electrically connected all in parallel, all in series, or in a series-parallel configuration. In a series-parallel configuration, the locomotive may have multiple parallel connected branches of DC electric traction motors, each branch including a plurality of DC electric traction motors electrically connected in series.

When a DC electric traction motor drives a propulsion device, if the torque produced by the DC electric traction motor becomes greater than the resistance torque exerted against the DC electric motor by the propulsion device, the DC electric traction motor may accelerate. This may occur, for example, in the case of a DC electric traction motor driving a wheel of a locomotive if the wheel torque applied to the wheel by the DC electric traction motor becomes greater than the adhesion torque resulting from the adhesion of the wheel to the associated rail. In many circumstances, without knowing the precise value of the adhesion torque between the wheel and the rail, the operator of a locomotive may try to maximize acceleration by attempting to increase the wheel torque generated by the DC electric traction motor to a high percentage of the adhesion torque. In doing so, the operator may sometimes increase the wheel torque beyond the adhesion torque. Additionally, the adhesion torque between the wheel and the rail may abruptly decrease at some points on the rail for various reasons, which may also cause the wheel torque to exceed the adhesion torque. When the wheel torque exceeds the adhesion torque, the wheel may begin to slip on the rail. This may cause undesirable wear of both the wheel and the rail.

Additionally, when the wheel begins to slip on the rail the coefficient of friction between the wheel and the rail may change from a static coefficient of friction to a dynamic coefficient, which may significantly reduce the adhesion torque. This may compromise the acceleration of the locomotive compared to the rate of acceleration possible if the wheel maintains traction on the rail, thereby compromising the productivity of the locomotive. It may also cause the wheel to accelerate. The more rapidly the wheel accelerates after losing traction, the more time and corrective action it will take to regain adhesion between the wheel and the rail. When the wheel slips, the rate at which the wheel and the DC electric traction motor accelerate depends on the torque generated by the DC electric traction motor. The more rapidly the torque generated by the motor decreases, the less rapidly the electric motor will accelerate.

The torque generated by a DC electric traction motor depends in part on the net voltage across the DC electric traction motor, which equals the difference between the external voltage supplied to the DC electric traction motor and the magnitude of the opposing "back EMF" generated internally by the DC electric traction motor. If the external voltage remains constant, increasing the back EMF decreases the net voltage across the DC electric traction motor, thereby decreasing the current through the armature, which decreases the torque generated by the DC electric traction motor. The back EMF generated by a DC electric motor equals the product of the electric current in the field coil, the speed of the DC electric traction motor, and a constant. The positive correlation between the speed of the DC electric traction motor and the back EMF creates a tendency for the back EMF to increase with increasing speed.

However, the configuration of a typical "series-wound" DC electric traction motor produces an effect that partially offsets the positive correlation between the back EMF and speed. Generally, a DC electric traction motor includes a field coil (a stationary coil) and an armature (a rotating coil mounted on the rotor of the electric motor). A series-wound DC electric traction motor has its field coil and armature electrically connected in series, which tends to result in the field coil carrying the same magnitude of electric current as the armature. Because of this, any increase in the back EMF would cause a decrease in the electric current in both the armature and the field coil, which would have the effect of decreasing the back EMF. With the current in the field coil forced to decrease at the same rate as the current in the armature and thereby largely offseting the effect of the increased speed on the back EMF, the back EMF generated by a typical series DC electric traction motor increases somewhat gradually with increasing speed. Accordingly, when the mechanical load on a typical series-wound DC electric motor decreases abruptly, the motor may accelerate to a very high speed relatively quickly.

One strategy for correcting wheel slip is to simply decrease the electrical power supplied to the traction motors. However, due to operating characteristics typical of systems that supply electricity to the traction motors, the amount of electrical power supplied to the traction motors may decrease more slowly than desired.

Another alternative strategy is disclosed in U.S. Pat. No. 3,898,937 to Johnson ("the '937 patent"), which discloses a system for addressing wheel slip in a locomotive that has series-wound DC electric traction motors driving its wheels. The system of the '937 patent includes a DC generator that supplies electricity to a plurality of series-wound DC electric traction motors. The '937 patent discloses that the DC electric traction motors may be electrically connected to one another in parallel or in a series-parallel configuration. To reduce the torque output of a DC electric traction motor when wheel-slippage is detected, the system of the '937 patent uses an auxiliary current source to supply additional electricity to the field coil of the DC electric traction motor, thereby increasing back EMF and decreasing torque output. In the case of a series-parallel connection of the DC electric traction motors, when slip is detected in one of the branches of DC electric traction motors, the system uses auxiliary current sources to supply additional electricity to the field coils of each of the DC electric traction motors in that branch. This reduces the torque output of each of the DC electric traction motors in the branch, thereby counteracting the wheel slip.

Although the '937 patent discloses a system for counteracting wheel slip in a locomotive, certain disadvantages persist. For example, approach disclosed by the '937 patent for counteracting wheel slip when the DC electric traction motors are connected in a series-parallel configuration may unnecessarily decrease the torque output of some of the DC electric traction motors. When the locomotive operates with the DC electric traction motors connected in a series-parallel configuration, it can happen that wheel slip will occur for one of the DC electric traction motors in the branch while the wheels driven by the other DC electric traction motors in the branch may have good traction. When this occurs, the system of the '937 patent will unnecessarily reduce torque produced by the DC electric traction motors whose wheels have good traction, in addition to reducing torque output by the DC electric traction motor experiencing wheel slip.

The mobile machine and methods of the present disclosure solve one or more of the problems set forth above.

SUMMARY OF THE INVENTION

One disclosed embodiment relates to a method of propelling a mobile machine. The mobile machine may have a plurality of DC traction motors, including a first DC traction motor and a second DC traction motor. The method may include driving a first traction device with the first DC traction motor, the first DC traction motor including a first field coil and a first armature electrically connected in series. The method may also include driving a second DC traction device with the second DC traction motor electrically connected in series with the first DC traction motor, the second DC traction motor including a second field coil and a second armature electrically connected in series. Additionally, the method may include, in response to slippage of the first traction device, bypassing at least a portion of electric current flowing through the first field coil around the first armature. The method may also include directing at least a portion of the bypassed electric current through the second field coil and the second armature.

Another embodiment relates to a method of propelling a mobile machine. The method may include driving a plurality of traction devices with a plurality of DC traction motors, each of the DC traction motors including a field coil and an armature electrically connected in series with the field coil. The method may also include controlling the electric current in each of the field coils using a target value of electric current for each of the field coils. The target value may be based on at least one of a magnitude of electric current in the field coil presently carrying a higher magnitude of electric current than the other field coils and a magnitude of electric current in the armature presently carrying a higher magnitude of electric current than the other armatures.

A further embodiment relates to a locomotive. The locomotive may include a first traction device and a second traction device. The locomotive may also include a first DC traction motor operable to drive the first traction device, the first DC traction motor including a first field coil and a first armature electrically connected in series. Additionally, the locomotive may include a second DC traction motor operable to drive the second traction device, the second DC traction motor including a second field coil and a second armature electrically connected in series with the second field coil. The second DC traction motor may be electrically connected in series with the first DC traction motor. The locomotive may also include propulsion controls operable to operate the first DC traction motor to drive the first traction device and the second DC traction motor to drive the second traction device.

The propulsion controls may also be operable to detect slippage of the first traction device. Additionally, the propulsion control may be operable to, in response to the detected slippage, bypass at least a portion of electric current flowing through the first field coil around the first armature. The propulsion controls may also be operable to direct at least a portion of the bypassed electric current through the second field coil and the second armature.

DETAILED DESCRIPTION

Figure 1:
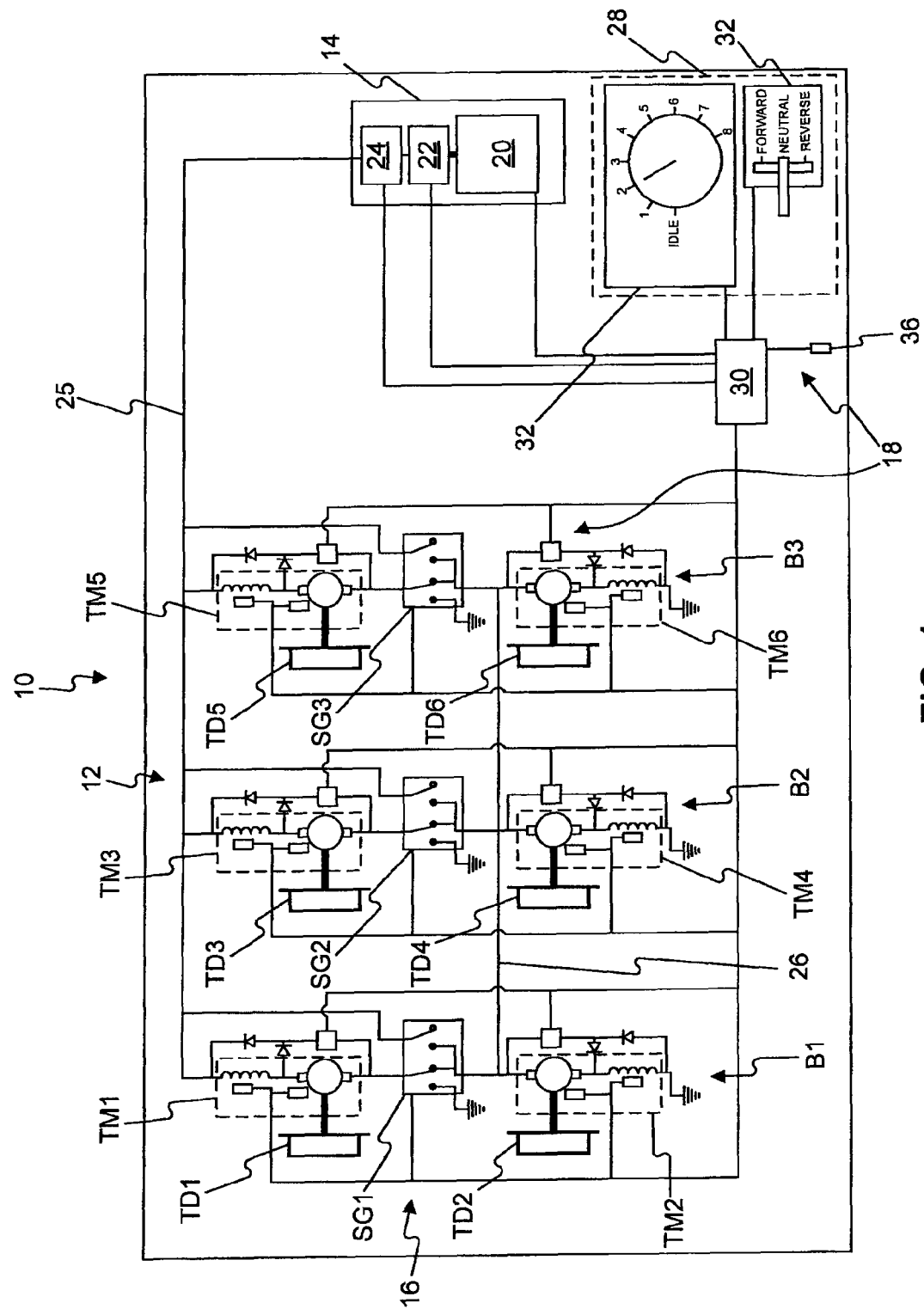
FIG. 1 is a schematic illustration of one embodiment of a machine that includes a power system according to the present disclosure with the power system in a first operating state.
Figure 2:
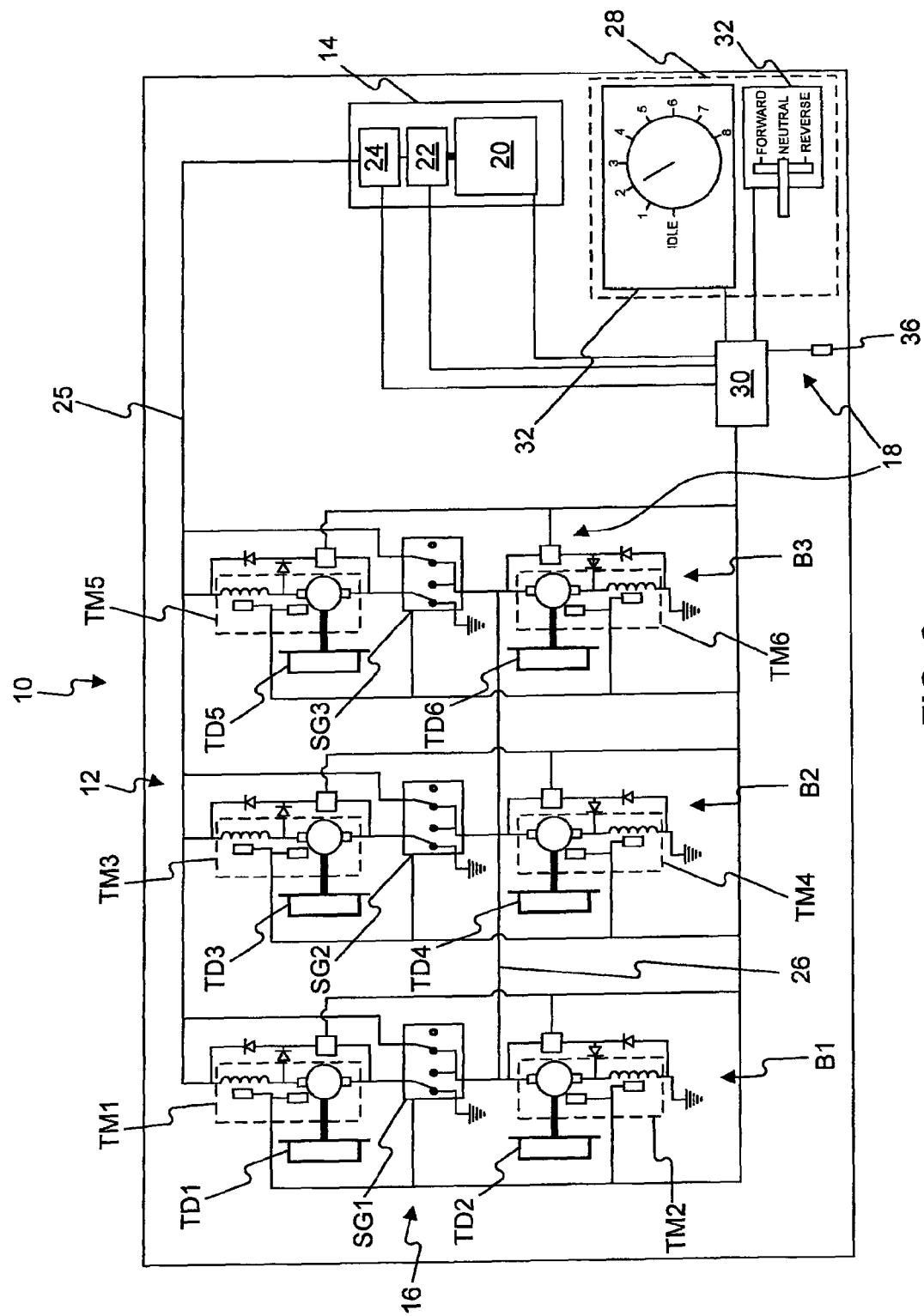
FIG. 2 is a schematic illustration of the power system shown in FIG. 1 in a second operating state.
Figure 3A:
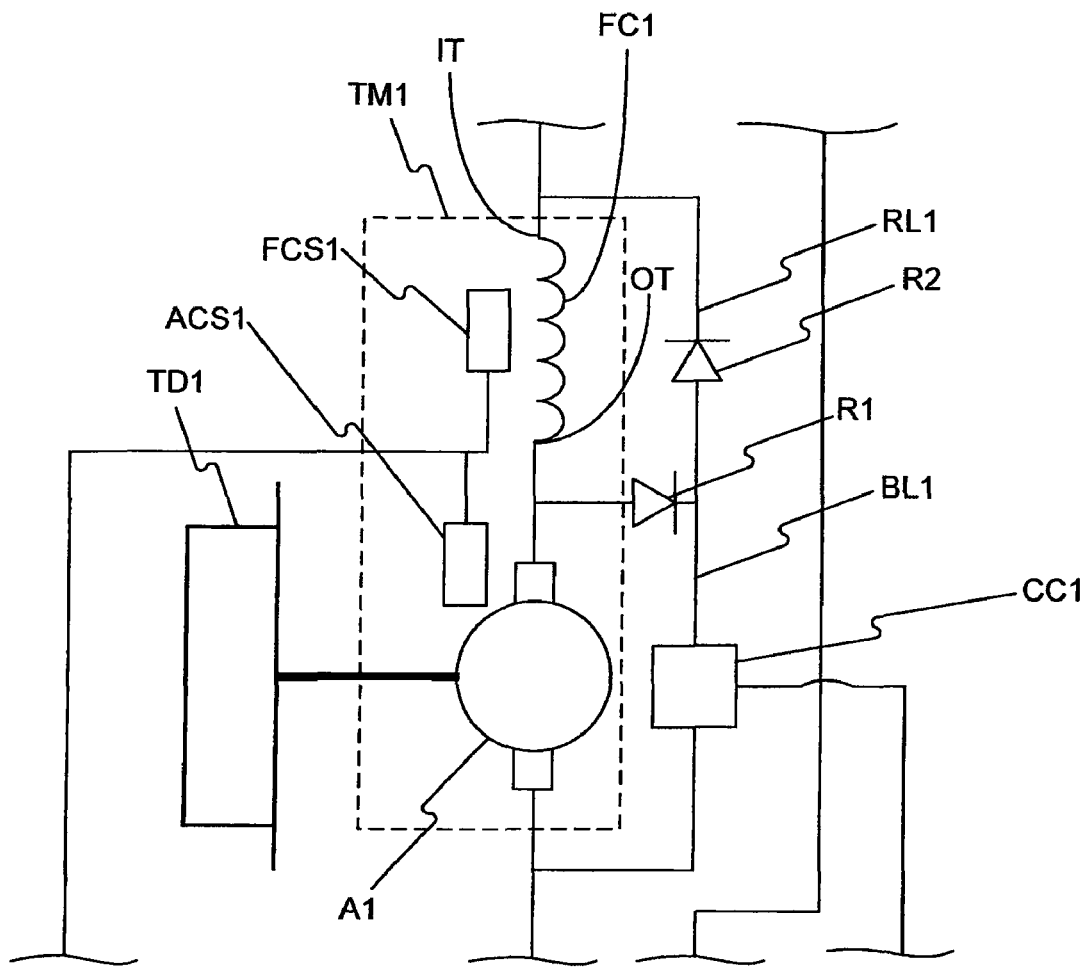
FIG. 3A shows a first portion of FIG. 1 in greater detail.
Figure 3B:
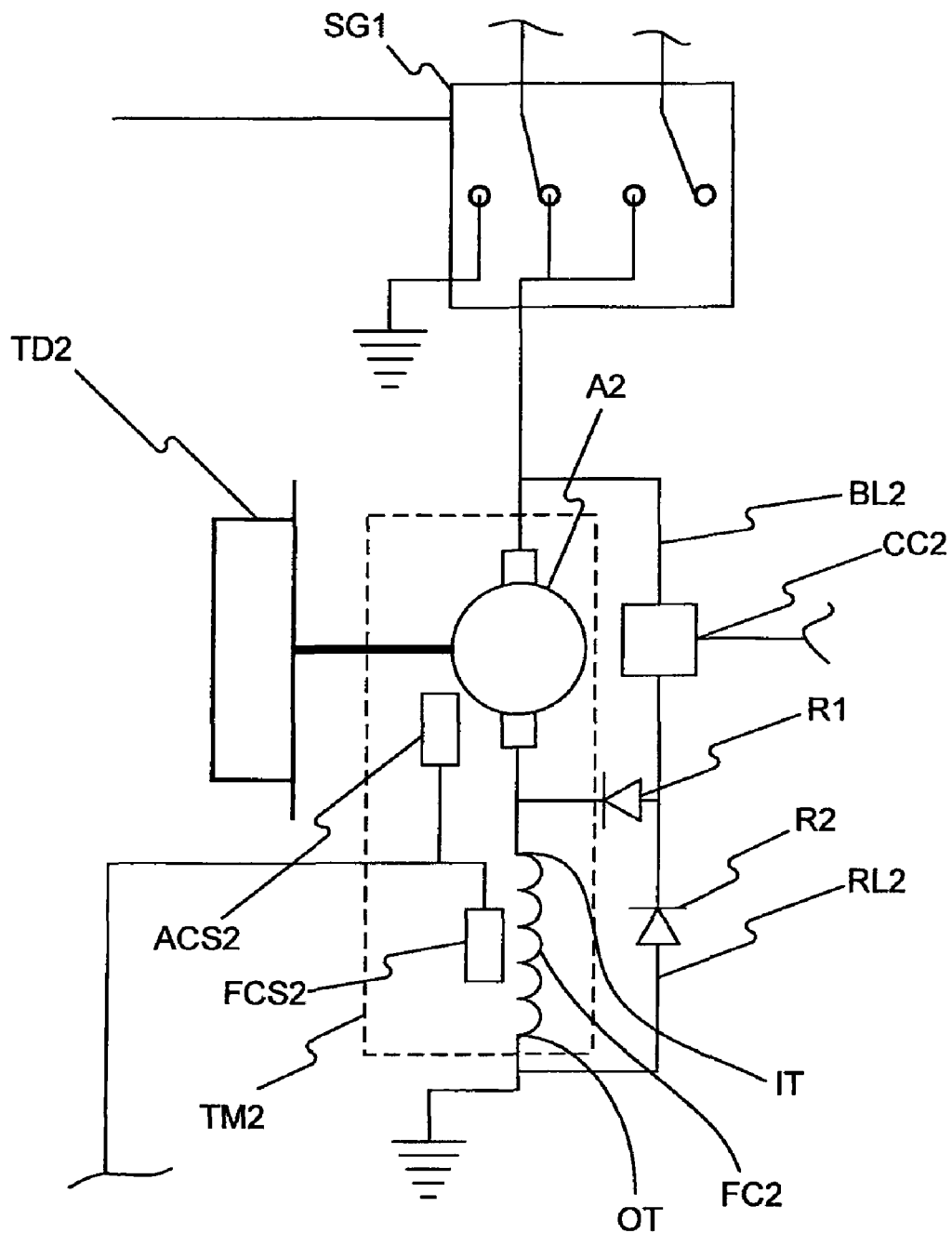
FIG. 3B shows second portion of FIG. 1 in greater detail.
Figure 3C:
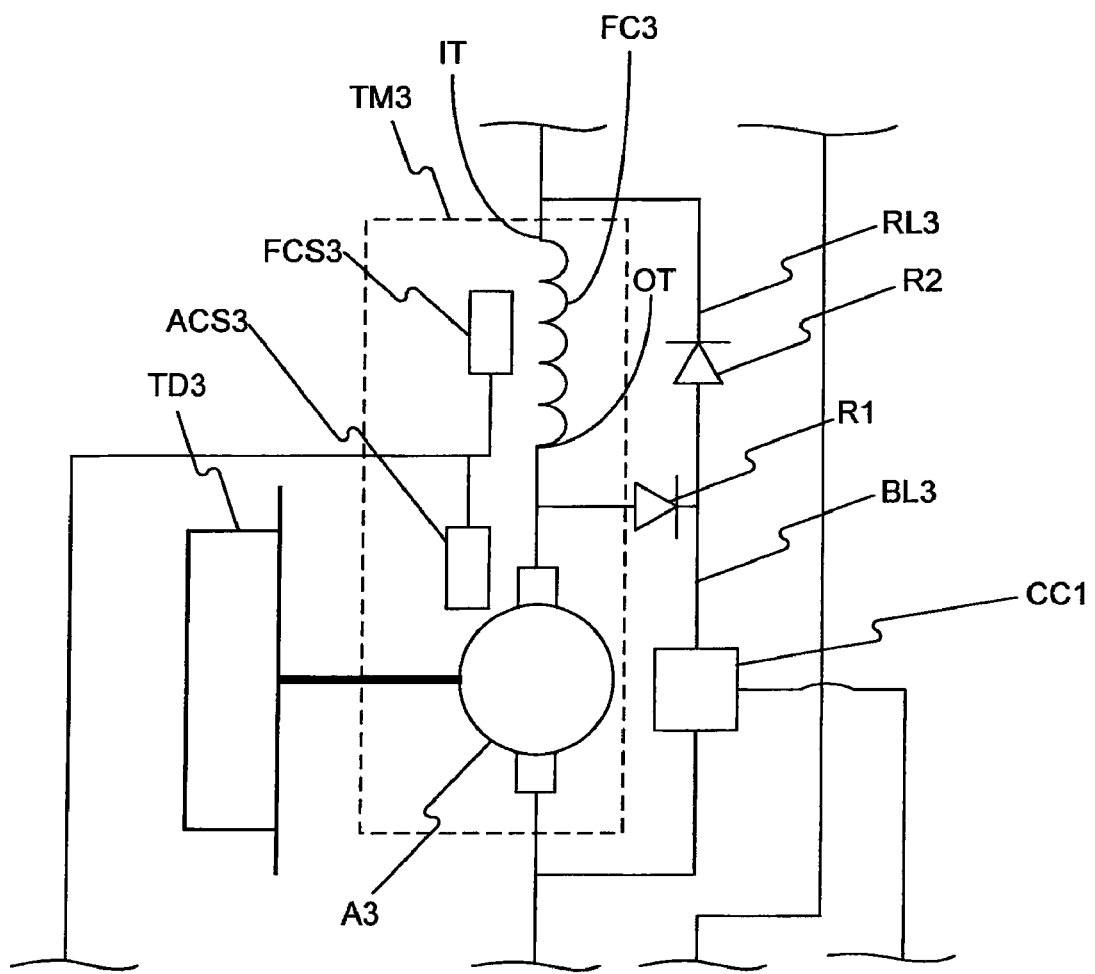
FIG. 3C shows third portion of FIG. 1 in greater detail.
Figure 3D:
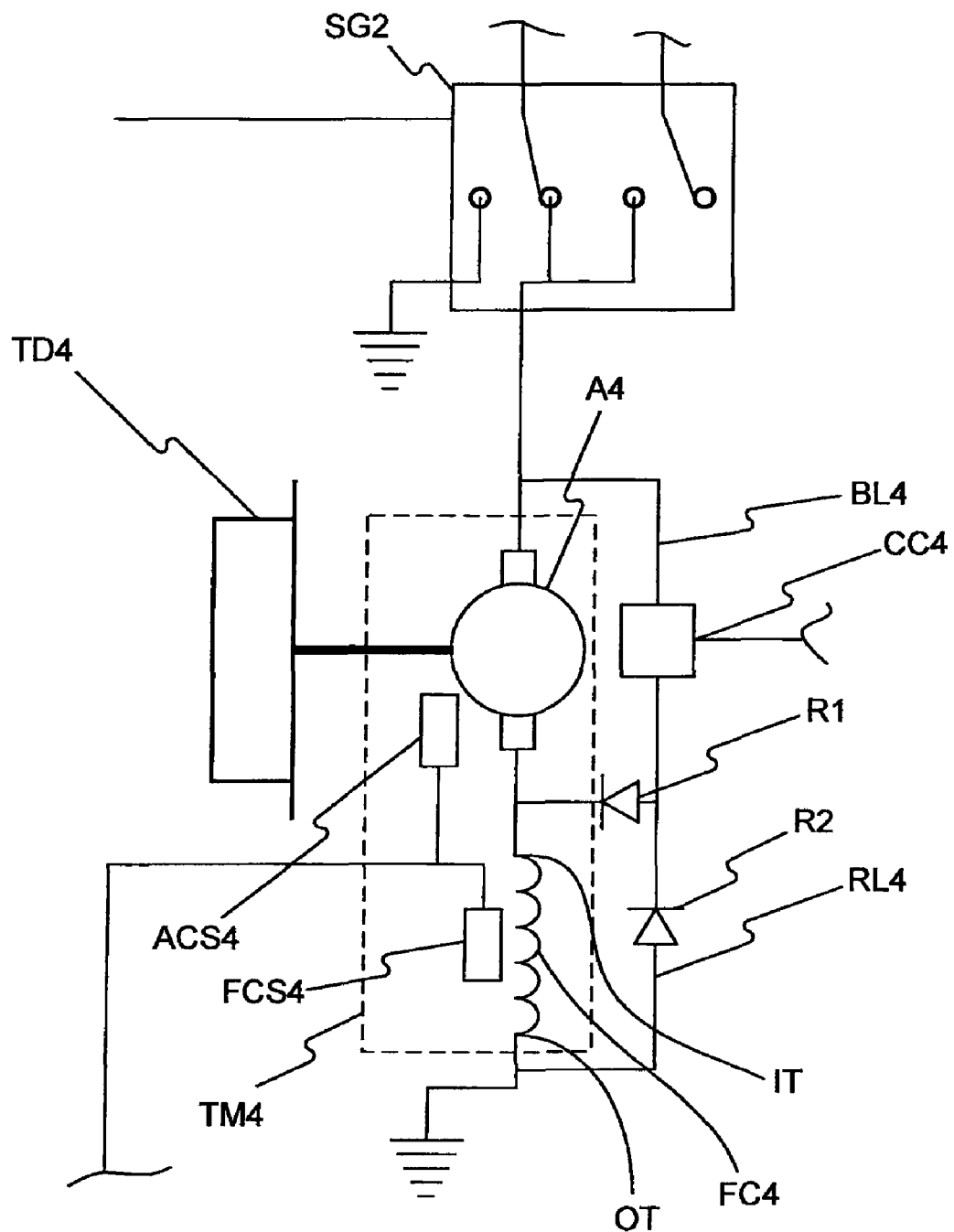
FIG. 3D shows fourth portion of FIG. 1 in greater detail.
Figure 3E:
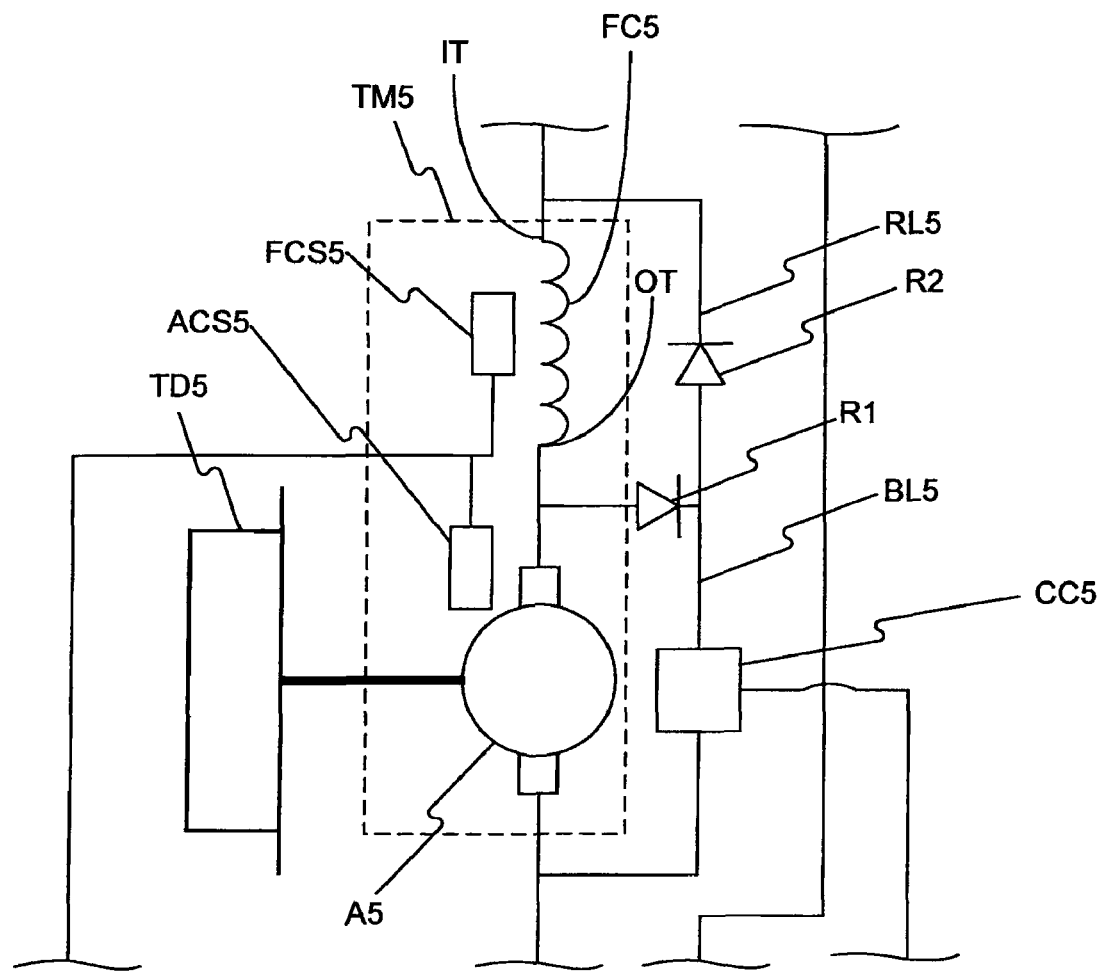
FIG. 3E shows fifth portion of FIG. 1 in greater detail.
Figure 3F:
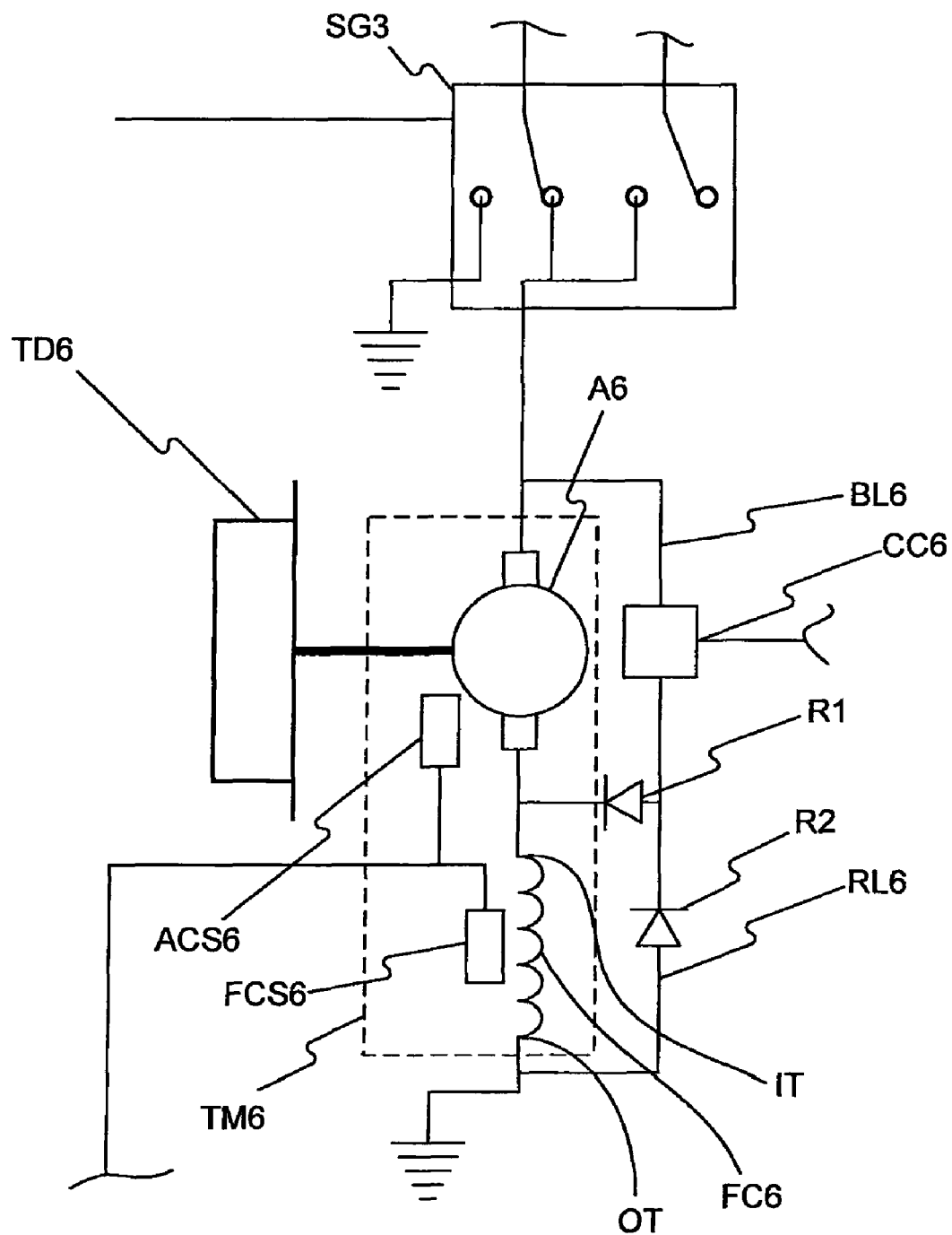
FIG. 3F shows sixth portion of FIG. 1 in greater detail.

FIGS. 1 and 2 illustrate a mobile machine 10 according to the present disclosure in different operating states. Mobile machine 10 may be, for example, a railroad locomotive. Mobile machine 10 may include a propulsion system 12 with a power supply 14, a drive group 16, and propulsion controls 18.

Power supply 14 may include any components operable to supply power for propelling mobile machine 10. For example, power supply 14 may include a prime mover 20 and an electric generator 22. Prime mover 20 may be any type of component operable to supply mechanical power. For example, prime mover 20 may be a diesel engine, a gasoline engine, a gaseous-fuel driven engine, or a turbine engine. Electric generator 22 may be drivingly connected to prime mover 20. Electric generator 22 may be any type of component operable to receive mechanical power from prime mover 20 and convert at least a portion of that power into electricity, including, but not limited to, a permanent-magnet generator, an AC induction generator, an AC synchronous generator, or a switched-reluctance generator. In embodiments where electric generator 22 produces AC electricity, power supply 14 may include rectification and/or a power regulator 24 operable to convert the AC electricity generated by electric generator 22 into DC electricity. Power regulator 24 may also be operable to control the voltage and/or the magnitude of current of the electricity supplied by power supply 14.

Drive group 16 may include traction motors TM1, TM2, TM3, TM4, TM5, TM6 and traction devices TD1, TD2, TD3, TD4, TD5, TD6. Each of FIGS. 3A-3F shows a portion of drive system 16 associated with one of traction motors TM1-TM6 in greater detail. Each traction motor TM1-TM6 may be a DC electric motor. Each traction motor TM1-TM6 may include a field coil FC1, FC2, FC3, FC4, FC5, FC6 and an armature A1, A2, A3, A4, A5, A6. In some embodiments, each traction motor TM1-TM6 may be a series-wound DC electric motor having its field coil FC1-FC6 and its armature A1-A6 electrically connected in series. Each field coil FC1-FC6 may include an input terminal IT and an output terminal OT.

Each traction device TD1-TD6 may be drivingly connected to an associated one of traction motors TM1-TM6, so that traction motors TM1-TM6 may drive traction devices TD1-TD6. Traction devices TD1-TD6 may be any kind of component operable to propel mobile machine 10 when driven by traction motors TM1-TM6. For example, in embodiments where mobile machine 10 is a locomotive, each traction device TD1-TD6 may be a wheel configured to ride on a rail.

As best shown in FIGS. 1 and 2, a power line 25 may electrically connect power regulator 24 of power supply 14 to drive group 16. Drive group 16 may include provisions for electrically connecting power line 25 and traction motors TM1-TM6 in various ways. These provisions may include switchgear SG1, SG2, SG3. For example, switchgear SG1, SG2, SG3 may be operable to connect traction motors TM1-TM6 to power line 25 all in series, all in parallel, or in a series-parallel configuration. FIG. 2 shows switchgear SG1-SG3 in an operating state where traction motors TM1-TM6 are electrically connected to power line 25 all in parallel.

On the other hand, FIG. 1 shows switchgear SG1-SG3 in an operating state that provides one exemplary series-parallel configuration of the electrical connections between power line 25 and traction motors TM1-TM6. In a series parallel configuration, drive group 16 may have traction motors TM1-TM6 connected in multiple parallel branches, each branch including two or more of traction motors TM1-TM6 electrically connected in series. For example, in the operating state shown in FIG. 1, switchgear SG1 may electrically connect traction motors TM1 and TM2 in series with one another to form a branch B1 of drive group 16. Similarly, switchgear SG2 may electrically connect traction motors TM3 and TM4 in series with one another to form a branch B2 connected in parallel with branch B1, and switchgear SG3 may electrically connect traction motors TM5 and TM6 in series with one another to form a branch B3 connected in parallel with branchs B1, B2. Drive group 16 may include a bridge 26 electrically connecting the middle nodes of branchs B1, B2, B3 to one another.

For each traction motor TM1-TM6, drive group 16 may include an electrically conductive return loop RL1, RL2, RL3, RL4, RL5, RL6 connected around the field coil FC1-FC6. Each return loop RL1-RL6 may include a rectifier R1 and a rectifier R2. Each rectifier R1, R2 may be a passive rectifier. For example, each of rectifiers R1, R2 may be a diode. Alternatively, rectifier R1 and/or rectifier R2 may be an active rectifier, such as an SCR (silicon controller rectifier), a GTO (gate turn-off), an IGBT (insulated gate bipolar transistor), or an FET (field-effect transistor). Rectifiers R1, R2 may be operable to prevent the flow of electricity from power line 25 around the associated field coil FC1-FC6, while, in certain circumstances allowing return flow of electricity from output terminal OT to input terminal IT of the associated field coil FC1-FC6. For example, in embodiments where rectifiers R1, R2 are diodes, rectifiers R1, R2 may each have their anodes connected to the output terminal OT and their cathodes connected to the input terminal IT of the associated field coil FC1-FC6.

In addition to return loops RL1-RL6, drive group 16 may include an electrically conductive bypass loop BL1, BL2, BL3, BL4, BL5, BL6 connected around the armature A1-A6 of each traction motor TM1-TM6. Each bypass BL1-BL6 may share rectifier R1 with the associated return loop RL1-RL6. Additionally, each bypass loop BL1-BL6 may include a current-control element CC1, CC2, CC3, CC4, CC5, CC6 operable to actively control the flow of electricity in the bypass loop BL1-BL6. For example, each current-control element CC1-CC6 may be operable to control whether, when, how much, and/or in what direction electricity flows in the associated bypass loop BL1-BL6. Each current-control element CC1-CC6 may, for example, use pulse-width-modulation to control whether and what percentage of the time electricity flows in the associated bypass loop BL1-BL6. In some embodiments, current-control element CC1-CC6 may be an active rectifier with one or more SCRs, GTOs, IGBTs, and/or FETs.

Propulsion controls 18 may include any components configured to operate propulsion system 12 in the manners discussed below. Propulsion controls 18 may, for example, include power regulator 24, switchgear SG1-SG3, current-control elements CC1-CC6, an operator interface 28, and a controller 30. Operator interface 28 may include various components operable to transmit operator inputs to other components of propulsion system 12. For example, operator interface 28 may include one or more components for transmitting operator inputs related to whether and in what direction the operator desires propulsion system 12 to propel mobile machine 10, such as a reverser 32. Additionally, operator interface 28 may include a throttle, such as a notch-power selector 34, for transmitting operator inputs related to how much propulsion power the operator desires from propulsion system 12. Operator interface 28 may be operatively connected to controller 30, so that operator interface 28 may transmit operator inputs related to the desired direction of travel, the desired propulsion power, and/or other aspects to controller 30.

Controller 30 may be operable to control one or more aspects of the operation of propulsion system 12 based at least in part on inputs from operator interface 28. Controller 30 may include, for example, one or more processor units (not shown) and one or more memory units (not shown). Controller 30 may be operatively connected to prime mover 20, electric generator 22, power regulator 24, switchgear SG1-SG3, and current-control elements CC1-CC6, so that controller 30 may control one or more aspects of the operation of each of these components based on inputs from operator interface 28 and/or other aspects of the operation of mobile machine 10. Controller 30 may receive inputs related to such other aspects of the operation of mobile machine 10 from various components. For example, for each traction motor TM1-TM6, propulsion controls 18 may include a field current sensor FCS1, FCS2, FCS3, FCS4, FCS5, FCS6 that supplies controller 30 with a signal indicating the magnitude of electric current in the associated field coil FC1-FC6. Similarly, propulsion controls 18 may include armature current sensors ACS1, ACS2, ACS3, ACS4, ACS5, ACS6 that supply controller 30 with signals indicating the magnitude of electric current in each of armatures A1-A6. Additionally, propulsion controls 18 may include a speed sensor 36 configured to provide controller 30 with a signal indicating the travel speed of mobile machine 10.

Mobile machine 10 and propulsion system 12 are not limited to the configuration discussed above and shown in FIGS. 1, 2, and 3A-3F. For example, propulsion system 12 may include other traction motors, in addition to traction motors TM1-TM6. Conversely, propulsion system 12 may omit one or more of traction motors TM1-TM6. Similarly, mobile machine 10 may include other traction devices, in addition to traction devices TD1-TD6, and/or mobile machine 10 may omit one or more of traction devices TD1-TD6. In some embodiments, propulsion system 12 may have multiple traction devices connected to each of traction motors TM1-TM6. Furthermore, mobile machine 10 may include other power supplies, in addition to, or in place of power supply 14. For example, propulsion system 12 may include one or more additional prime movers drivingly connected to electric generators for supplying electricity to power line 25. Propulsion system 12 may also include other types of power supplies connected to power line 25, including, but not limited to, batteries, capacitors, and fuel cells.

Propulsion controls 18 may also have a different configuration than shown in FIGS. 1, 2, and 3A-3F. For example, in place of controller 30, propulsion controls 18 may have multiple control components that collectively control the various aspects of the operation of propulsion system, such as multiple controllers and/or hardwired control circuits. Additionally, mobile machine 10 may include switchgear of a different configuration than switchgear SG1-SG3. Alternatively, mobile machine 10 may omit switchgear altogether, having a fixed configuration of electrical connections between power line 25 and traction motors TM1-TM6. Furthermore, propulsion controls 18 may include other components, in addition to current-control elements CC1-CC6, for controlling the flow of electricity in bypass loops BL1-BL6. Additionally, operator interface 28 may include other components, in addition to, or in place of, reverser 32 and notch-power selector 34.

INDUSTRIAL APPLICABILITY

Propulsion system 12 may have application for propelling any type of mobile machine 10, and mobile machine 10 may have use in any application requiring transportation. In response to operator inputs requesting propulsion of mobile machine 10, propulsion controls 18 may propel mobile machine 10 as follows. Propulsion controls 18 may operate prime mover 20 to drive electric generator 22, thereby generating electricity and supplying that electricity through power regulator 24 to power line 25. From power line 25, the electricity may flow through each of traction motors TM1-TM6, which may use the electricity to drive traction devices TD1-TD6. Driven by traction motors TM1-TM6, traction devices TD1-TD6 may exert tractive force against whatever base traction devices TD1-TD6 ride on, thereby propelling mobile machine 10. For example, where mobile machine 10 is a locomotive and traction devices TD1-TD6 are wheels riding on rails, traction devices TD1-TD6 may apply tractive force to the rails to propel mobile machine 10.

When operating propulsion system 12 to propel mobile machine 10 in this manner, propulsion controls 18 may control the operating state of switchgear SG1, SG2, SG3 based on various operating parameters, including, but not limited to, the travel speed of mobile machine 10, as sensed by speed sensor 36. Within one speed range, propulsion controls 18 may implement the operating state of switchgear SG1-SG3 shown in FIG. 1 to provide series-parallel connection of traction motors TM1-TM6 to power line 25. In a higher speed range, propulsion controls 18 may transition switchgear SG1-SG3 to the operating state shown in FIG. 2 to provide parallel connection of traction motors TM1-TM6 to power line 25. With the series-parallel configuration of FIG. 1 implemented, electric current flowing through field coil FC1 and armature A1 of traction motor TM1 also flows through field coil FC2 and armature A2 of traction motor TM2. Traction motors TM3 and TM4 may similarly share the same electric current, and traction motors TM5 and TM6 may share the same electric current. Additionally, bridge 26 may allow current sharing between branches B1-B3. In the parallel configuration illustrated in FIG. 2, each traction motor TM1-TM6 may separately receive electric current from power line 25.

In either the series-parallel configuration of FIG. 1 or the parallel configuration of FIG. 2, as long as traction devices TD1-TD6 all maintain traction, substantially equal quantities of electric current may tend to flow through each of traction motors TM1-TM6. However, slippage of one or more of traction devices TD1-TD6 on the underlying surface due to insufficient traction may tend to create differences between the magnitude of electric current flowing through the different traction motors TM1-TM6. When a traction device TD1-TD6 slips on the underlying base, the torque applied to the traction device TD1-TD6 by the associated traction motor TM1-TM6 may rapidly increase the speed of the traction device TD1-TD6 and the traction motor TM1-TM6 itself. As discussed above, when the traction motor TM1-TM6 accelerates, increasing back EMF of the traction motor TM1-TM6 may drive down the magnitude of electric current in the armature A1-A6 of the traction motor TM1-TM6, tending to drive down the magnitude of the electric current in the series-connected field coil FC1-FC6. Thus, by monitoring the signals from armature current sensors ACS1-ACS6, propulsion controls 18 may detect slippage of any of traction devices TD1-TD6 when the magnitude of electric current in an armature A1-A6 drops significantly below that in others of the armatures A1-A6.

In the event that one or more of traction devices TD1-TD6 lose traction and slip, propulsion system 12 may provide both passive and active measures for suppressing and arresting the slippage, while maintaining high tractive effort of the traction devices TD1-TD6 that have traction. The inclusion of return loops RL1-RL6 with their rectifiers R1, R2 may provide a rapid, passive response that suppresses the rate of acceleration of any slipping traction device TD1-TD6. When slippage of a traction device TD1-TD6 and the corresponding decrease in electric current in the associated armature A1-A6 starts to drive down electric current in the associated field coil FC1-FC6, the inductance of the field coil FC1-FC6 may drive the voltage of its output terminal OT higher than that of is input terminal IT. With the voltage at output terminal OT higher than that at input terminal IT, rectifiers R1, R2 may allow recirculation of current from the output terminal OT of the field coil FC1-FC6, through the return loop RL1-RL6, to the input terminal IT of the field coil FC1-FC6, and back through the field coil FC1-FC6. Thus, the return loop RL1-RL6 with its rectifiers R1, R2 may allow the inductance of the field coil FC1-FC6 to hold up the magnitude of the electric current in the field coil FC1-FC6 when slippage of the associated traction device TD1-TD6 occurs. This practically instantaneous response may cause the back EMF to rise more rapidly, thereby quickly and effectively suppressing the rate of acceleration of the slipping traction device TD1-TD6.

In addition to the above-described passive effect, propulsion controls 18 may arrest the slippage with active control of the associated current control element CC1-CC6. If propulsion controls 18 detect slippage of a traction device TD1-TD6, propulsion controls 18 may arrest that slippage by operating the associated current-control element CC1-CC6 to allow at least a portion of electric current flowing through the associated field coil FC1 to bypass the associated armature A2 through the associated bypass loop BL1. Providing the bypass loop BL1-BL6 as an alternate path for the electric current flowing through the field coil FC1-FC6 may enable propulsion controls 18 to indefinitely maintain a high magnitude of electric current in the field coil FC1-FC6 while the electric current in the armature A1-A6 is dropping. Indeed, by controlling the amount of electric current allowed to bypass the armature A1-A6 associated with a slipping traction device TD1-TD6, propulsion controls 18 may control the magnitude of electric current in the associated field coil FC1-FC6 independently of the electric current in the armature A1-A6, as is discussed in more detail below. By controlling the electric current in the field coil FC1-FC6 of the traction motor TM1-TM6 experiencing wheel slip, propulsion controls 18 may elevate the back EMF of the traction motor TM1-TM6 sufficiently to quickly reduce the torque output of the traction motor TM1-TM6 to a level sufficient to arrest the wheel slip.

When operating with drive group 16 in the series-parallel configuration of FIG. 1, propulsion system 12 may execute the above current bypass strategy in a manner that maintains relatively high electric current flow through the traction motors TM1-TM6 of all non-slipping traction devices TD1-TD6. Specifically, when a traction device TD1-TD6 slips, propulsion controls 18 may direct all of the current bypassed around the associated armature A1-A6 through the other traction motor TM1-TM6 in that branch B1-B3. For example, if traction device TD1 slips and traction device TD2 does not, propulsion controls 18 may bypass at least a portion of the current flowing through field coil FC1 around armature A1, while directing all of the current bypassed around armature A1 through field coil FC2 and armature A2. Conversely, if traction device TD2 slips and traction device TD1 does not, propulsion controls 18 may bypass at least a portion of the electric current flowing through field coil FC2 around armature A2, while directing all of the current bypassed around armature A2 through both field coil FC1 and armature A1. By directing the electric current bypassed around the armature A1-A6 associated with the slipping traction device TD1-TD6 to the other traction motor TM1-TM6 in the branch B1-B3, propulsion controls 18 may maintain relatively high torque output of the traction motor TM1-TM6 associated with the non-slipping traction device TD1-TD6. By arresting slippage of any traction devices TD1-TD6 in a manner that maintains high tractive effort of the non-slipping traction devices TD1-TD6, propulsion controls 18 may help mobile machine 10 to more closely approach maximum tractive effort and promote high productivity of mobile machine 10.

Propulsion controls 18 may employ various approaches for controlling the bypass of electric current around an armature A1-A6 when the associated traction device TD1-TD6 slips. As noted above, in some embodiments, propulsion controls 18 may use pulse-width-modulation control of each current-control element CC1-CC6 to control the percentage of time (i.e., duty cycle) during which the associated bypass loop BL1-BL6 allows current flow around the associated armature A1-A6. In other words, propulsion controls 18 may operate the current-control element CC1-CC6 to rapidly cycle between allowing and preventing current flow through the bypass loop BL1-BL6, controlling the duration of each period when current is allowed to flow relative to the duration of each period when current is prevented from flowing. During such operation, in the periods when the current-control element CC1-CC6 prevents current flow through the bypass loop BL1-BL6, the inductance of the field coil FC1-FC6 may drive electricity through the return loop RL1-RL6.

Propulsion controls 18 may also use various approaches for determining how much electric current to bypass around each armature A1-A6. In some embodiments, propulsion controls 18 may continually determine a target magnitude of electric current in each of field coils FC1-FC6 and control the amount of electric current bypassed around each of the associated armatures A1-A6 to maintain the magnitude of electric current in each field coil FC1-FC6 at its target value. Propulsion controls 18 may, for example, use the same target value for each field coil FC1-FC6. Propulsion controls 18 may determine the target value for the magnitude of electric current in each field coil FC1-FC6 based on various operating conditions.

In some embodiments, propulsion controls 18 may base the target value for the current in each field coil FC1-FC6 on the magnitude of electric current flowing in one or more individual traction motors TM1-TM6. Propulsion controls 18 may, for example, monitor the magnitude of electric current in each field coil FC1-FC6 to determine which of the field coils FC1-FC6 is carrying a higher magnitude of electric current than each of the other field coils FC1-FC6 and the magnitude of the electric current in that field coil FC1-FC6. In other words, propulsion controls 18 may determine the highest magnitude of electric current in any individual field coil FC1-FC6. Propulsion controls 18 may then use this identified magnitude of electric current in the field coil FC1-FC6 carrying the most current as the target value for the magnitude of the electric current in all of the other field coils FC1-FC6. Alternatively, propulsion controls 18 may determine a magnitude of electric current in the armature A1-A6 presently carrying more electric current than the other armatures A1-A6 and use that magnitude of electric current as the target value for the electric current in each of field coils FC1-FC6.

Using the highest magnitude of electric current in any individual field coil FC1-FC6 or the highest magnitude of electric current in any individual armature A1-A6 as a target value for the electric current in each of the field coils FC1-FC6 may provide very effective control for maintaining the tractive effort at each traction device TD1-TD6 near the threshold of available traction. The traction motor TM1-TM6 carrying the highest magnitude of electric current in its field coil FC1-FC6 and its armature A1-A6 typically is generating the highest tractive effort among all of the traction motors TM1-TM6. This reliably indicates that the traction device TD1-TD6 driven by this traction motor TM1-TM6 is not slipping. Likewise, the magnitude of electric current carried in the field coil FC1-FC6 or armature A1-A6 of this traction motor TM1-TM6 may serve as a good estimate of the maximum electric current the other traction motors TM1-TM6 can carry without inducing slip. Accordingly, by controlling the magnitude of electric current in each of the other traction motors TM1-TM6 toward that target value, propulsion controls 18 may very effectively drive the tractive effort of each traction motor TM1-TM6 to the prevailing traction threshold without frequently inducing wheel-slip or overheating any of traction motors TM1-TM6.

Control of propulsion system 12 by propulsion controls 18 is not limited to the examples provided above. Propulsion controls 18 may use various approaches other than pulse-width-modulation control to control the amount of current allowed to bypass an armature A1-A6 through the associated bypass loop BL1-BL6. Additionally, propulsion controls 18 may use a different target for the magnitude of electric current in each of field coils FC1-FC6 than the highest magnitude of electric current in the field coils FC1-FC6 or the highest magnitude of electric current in the armatures A1-A6. For example, propulsion controls 18 may use one or both of these parameters in combinations with one or more other parameters to determine a target value for the electric current in each field coil FC1-FC6. Alternatively, propulsion controls 18 may not use either the highest magnitude of electric current in the field coils FC1-FC6 or the highest magnitude of electric current in the armatures A1-A6 as a factor in determining a target for the magnitude of electric current in each field coil FC1-FC6. Additionally, rather than using the same target value for the magnitude of electric current in all of the field coils FC1-FC6, propulsion controls 18 may determine different target values for the magnitude of electric current in the different field coils FC1-FC6. Furthermore propulsion controls 18 may control the amount of electric current bypassed around each armature A1-A6 in various manners other than to control the magnitude of electric current in each field coil FC1-FC6 to a target value. Additionally, in some embodiments, propulsion controls 18 may leave drive group 16 in a series configuration, a parallel configuration, or a series-parallel configuration at all times, rather than transitioning between a series-parallel and a parallel configuration, as discussed above.

It will be apparent to those skilled in the art that various modifications and variations can be made in the mobile machine and methods without departing from the scope of the disclosure. Other embodiments of the disclosed mobile machine and methods will be apparent to those skilled in the art from consideration of the specification and practice of the power system and methods disclosed herein. It is intended that the specification and examples be considered as exemplary only, with a true scope of the disclosure being indicated by the following claims and their equivalents.

What is claimed is:

1. A method of propelling a mobile machine having a plurality of DC traction motors, including a first DC traction motor and a second DC traction motor, the method including:
    driving a first traction device with the first DC traction motor, the first DC traction motor including a first field coil and a first armature electrically connected in series;
    driving a second traction device with the second DC traction motor electrically connected in series with the first DC traction motor, the second DC traction motor including a second field coil and a second armature electrically connected in series; and
    in response to slippage of the first traction device
        bypassing at least a portion of electric current flowing through the first field coil around the first armature, and
        directing at least a portion of the bypassed electric current through the second field coil and the second armature.

2. The method of claim 1, wherein bypassing at least a portion of electric current flowing through the first field coil around the first armature to the second field coil and the second armature includes controlling the bypass of current around the first armature to control the electric current flowing through the first field coil toward a target value.

3. The method of claim 2, wherein the target value is based on the magnitude of electric current in a field coil of the plurality of DC traction motors that is presently carrying a higher magnitude of electric current than each other field coil of the DC traction motors.

4. The method of claim 2, wherein the target value is based on the magnitude of electric current in an armature of the plurality of DC traction motors that is presently carrying a higher magnitude of electric current than each other armature of the DC traction motors.

5. The method of claim 2, wherein the target value is equal to the magnitude of electric current in a field coil of the plurality of DC traction motors that is presently carrying a higher magnitude of electric current than each other field coil of the DC traction motors.

6. The method of claim 2, wherein the target value is equal to the magnitude of electric current in an armature of the plurality of DC traction motors that is presently carrying a higher magnitude of electric current than each other armature of the DC traction motors.

7. The method of claim 1, further including, in addition to bypassing at least a portion of electric current flowing through the first field coil around the first armature to the second field coil and the second armature, returning at least a portion of the electric current flowing through the field coil from an output terminal of the first field coil back to an input terminal of the first field coil.

8. The method of claim 1, wherein bypassing at least a portion of electric current flowing through the first field coil around the first armature to the second field coil and the second armature includes controlling the bypass of current around the first armature based at least in part on a magnitude of electric current flowing through one of the other field coils of the plurality of DC traction motors.

9. The method of claim 1, wherein bypassing at least a portion of electric current flowing through the first field coil around the first armature to the second field coil and the second armature includes controlling the bypass of current around the first armature based at least in part on a magnitude of electric current in one of the other armatures of the plurality of DC traction motors.

10. The method of claim 1, further including:
    detecting slippage of the second traction device; and
    in response to the detected slippage of the second traction device
        bypassing at least a portion of electric current flowing through the second field coil around the second armature, and
        directing at least a portion of the bypassed electric current through the second field coil and the second armature.

11. A method of propelling a mobile machine, including:
    driving a plurality of traction devices with a plurality of DC traction motors, including driving a first traction device with a first DC traction motor and driving a second traction device with a second DC traction motor electrically connected in series with the first DC traction motor, each of the DC traction motors including a field coil and an armature electrically connected in series with the field coil;
    controlling the electric current in each of the field coils using a target value of electric current for each of the field coils, the target value being based on at least one of a magnitude of electric current in the field coil presently carrying a higher magnitude of electric current than the other field coils and a magnitude of electric current in the armature presently carrying a higher magnitude of electric current than the other armatures, including, in response to slippage of the first traction device
        bypassing at least a portion of electric current flowing through a field coil of the first DC traction motor around an armature of the first DC traction motor, and
        directing at least a portion of the bypassed electric current through a field coil and armature of the second DC traction motor.

12. The method of claim 11, wherein the target value is equal to the magnitude of electric current in the field coil presently carrying a higher magnitude of electric current than the other field coils.

13. The method of claim 11, wherein the target value is equal to the magnitude of electric current in the armature presently carrying a higher magnitude of electric current than the other armatures.

14. The method of claim 11, wherein controlling the electric current in the field coil of the first DC traction motor toward the target value further includes, in addition to bypassing at least a portion of electric current flowing through the field coil of the first DC traction motor around the armature of the first DC traction motor to the field coil of the second DC traction motor, returning at least a portion of the electric current flowing through the field coil of the first DC traction motor from an output terminal of the field coil of the first DC traction motor back to an input terminal of the field coil of the first DC traction motor.

15. A locomotive, including:
a first traction device;
a second traction device;
a first DC traction motor operable to drive the first traction device, the first DC traction motor including a first field coil and a first armature electrically connected in series;
a second DC traction motor operable to drive the second traction device, the second DC traction motor including a second field coil and a second armature electrically connected in series with the second field coil, the second DC traction motor being electrically connected in series; and
propulsion controls operable to
  operate the first DC traction motor to drive the first traction device and the second DC traction motor to drive the second traction device,
  detect slippage of the first traction device,
  in response to the detected slippage
    bypass at least a portion of electric current flowing through the first field coil around the first armature, and
    direct at least a portion of the bypassed electric current through the second field coil and the second armature.

16. The mobile machine of claim 15, further including an electrically conductive loop connected between an output terminal of the first field coil and an input terminal of the first field coil, wherein during the detected slippage of the first traction device, the electrically conductive loop carries at least a portion of the electric current flowing through the first field coil from the output terminal of the first field coil back to the input terminal of the first field coil.

17. The mobile machine of claim 16, wherein the electrically conductive loop includes a rectifier having its anode connected to the output of the field coil and its cathode connected to the input of the field coil.

18. The mobile machine of claim 15, wherein the propulsion controls are further operable to:
  detect slippage of the second traction device,
  in response to the detected slippage of the second traction device
    bypass at least a portion of electric current flowing through the second field coil around the second armature, and
    direct at least a portion of the bypassed electric current through the first field coil and the first armature.

* * * * *